(12) United States Patent
Biegelsen et al.

(10) Patent No.: US 7,969,472 B2
(45) Date of Patent: Jun. 28, 2011

(54) AUTOMATIC CAMERA STEERING CONTROL AND VIDEO CONFERENCING

(75) Inventors: David K. Biegelsen, Palo Alto, CA (US); Andrew Berlin, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 2130 days.

(21) Appl. No.: 10/063,172

(22) Filed: Mar. 27, 2002

(65) Prior Publication Data

US 2003/0184645 A1 Oct. 2, 2003

(51) Int. Cl.
*H04N 7/14* (2006.01)
*H04N 5/232* (2006.01)
*H04N 5/225* (2006.01)

(52) U.S. Cl. ............... 348/211.12; 348/14.1; 348/14.16; 348/207.11

(58) Field of Classification Search .... 348/14.01–14.16, 348/143, 156, 169, 207.99, 207.1, 207.11, 348/208.14, 211.7, 211.12, 373–376
See application file for complete search history.

(56) References Cited

U.S. PATENT DOCUMENTS

| | | | | |
|---|---|---|---|---|
| 5,564,698 A | * | 10/1996 | Honey et al. | 473/570 |
| 5,793,630 A | | 8/1998 | Theimer et al. | |
| 5,844,599 A | * | 12/1998 | Hildin | 348/14.1 |
| 5,912,700 A | * | 6/1999 | Honey et al. | 348/157 |
| 5,963,250 A | * | 10/1999 | Parker et al. | 348/211.6 |
| 6,067,112 A | * | 5/2000 | Wellner et al. | 348/211.4 |
| 6,437,820 B1 | * | 8/2002 | Josefsson | 348/169 |
| 6,545,670 B1 | * | 4/2003 | Pryor | 345/173 |
| 7,015,950 B1 | * | 3/2006 | Pryor | 348/207.11 |
| 2003/0169339 A1 | * | 9/2003 | Allen et al. | 348/169 |
| 2004/0002636 A1 | * | 1/2004 | Teicher et al. | 600/300 |
| 2004/0008264 A1 | * | 1/2004 | Nister | 348/207.99 |

OTHER PUBLICATIONS

"CameraMan", www.parkervision.com/cameraman_body.htm.
S. Mukhopadhyay et al., "Passive Capture and Structuring of Lectures", Department of Computer Science, Cornell University, pp. 477-487.
Michael H. Bianchi, "AutoAuditorium: a Fully Automatic, Multi-Camera System to Televise Auditorium Presentations", AutoAuditorium System: Smart Spaces Conference Paper, pp. 1-10.

* cited by examiner

*Primary Examiner* — Sinh Tran
*Assistant Examiner* — Daniel M Pasiewicz
(74) *Attorney, Agent, or Firm* — Oliff & Berridge, PLC

(57) ABSTRACT

An automatic camera steering control for directing video conferences including a communicator with a microphone and a voice activated LED emitter. Cameras receive an LED signal transmitted by the LED emitter and focus on the speaker associated with the activated LED emitter. A controller automatically selects and inserts into the video stream the audio and video of the speaker.

33 Claims, 4 Drawing Sheets

AUTOMATIC CAMERA STEERING CONTROL AND VIDEO CONFERENCING

BACKGROUND OF THE INVENTION

1. Field of Invention

This invention relates to systems and methods for manipulating a recording device. More particularly, this invention relates to automatically steering cameras to capture conference participants based on infrared signals received from a communication device worn by each participant.

2. Description of Related Art

Conventional video conference systems utilize a single camera with a single fixed focus to capture a meeting or presentation. These systems are advantageous in that the costs for the camera and other related equipment are low. However, utilizing only a single camera in this manner provides a rather static presentation, which is typically perceived as boring. For example, the captured presentation does not follow the flow of speaker or presentation activity within the meeting.

Vendors of conference systems have attempted to address these problems by adding multiple cameras to their systems. Multiple camera systems are advantageous in that they provide multiple views of the meeting. However, these systems are disadvantageous in that they require that a great deal of attention be focused on operating the system. For example, multiple video camera conferencing systems require that a dedicated operator perform various tasks, such as selecting a video feed from the multiple cameras, selecting a camera to zoom, deciding when to switch cameras to focus on another activity in the meeting, and deciding exactly which activity to switch to.

Therefore, conventional multi-camera systems require a trained operator to perform these functions, which imposes additional resource constraints on scheduling and conducting captured meetings and presentations. For example, when the operator is unavailable for some reason, such as due to a scheduling conflict, illness, etc., the meeting must be rescheduled. Similarly, if there is a desire to maintain secrecy of the subject matter of the meeting or presentation, the meeting must be scheduled around the availability of an operator with the appropriate clearance, if one even exists.

Due to current technological constraints, video conferencing may be encumbered by poor information bandwidth. Thus, various images, such as images of people, may have little resolvable detail, and current camera steering mechanisms, either automated or under human control, may also be subject to various problems, such as being activated by and thereby pointing at undesirable sounds (coffee pot, pencil tapping, etc.). These steering mechanisms may also be burdensome, and therefore operated improperly, if manual operation is required.

Experimental conference systems have been described in: "AutoAuditorium: a Fully Automatic, Multi-Camera System to Televise Auditorium Presentation," by Bianchi, M., Joint DARPA/NIST Smart Spaces Technology Workshop, Gaithersburg, Md., Jul., 1998; and "Passive Capture and Structuring of Lectures," by Mukhopadhyay, S. et al. in Proc. ACM Multimedia 99, pp. 477-487, 1999. However, these systems only operate under the limited conditions of a single speaker making a presentation.

U.S. Pat. No. 5,793,630, which is incorporated herein by reference in its entirety, discloses identifying spatially localizable portable electronic devices using video cameras capable of detecting both visible light and infrared. However, this system is limited to transferring electronic data to electronic devices at predetermined locations.

SUMMARY OF THE INVENTION

This invention provides systems and methods to automatically capture the presentations of participants at a meeting by utilizing a camera that steers and focuses on a participant based on a signal received by a communication device worn by each participant.

This invention separately provides systems and methods which utilize a camera that is steerable based on signals received from an infrared LED.

This invention separately provides systems and methods for utilizing communicators which include at least one infrared LED.

This invention separately provides systems and methods for encoding information in the infrared and/or audio streams.

This invention separately provides systems and methods for using a laser pointer with coaxial, modulated infrared beam to guide cameras.

In various exemplary embodiments of systems and methods according to this invention, an electronic CCD or CMOS video camera capable of detecting both visible light and infrared are provided.

In various exemplary embodiments according to the invention, a communicator, which includes a lightweight wireless microphone and at least one infrared LED, is used to identify a speaker and the speaker's location. In various exemplary embodiments, the LED is turned on when the microphone detects a sound level above a threshold. The light emitted by the LED is sensed by the camera and is used to point the camera to focus on the current speaker.

Various other exemplary embodiments of the systems and methods according to the invention include associating data with the microphone that is utilized by the video system to relate the data to the display video image.

In other exemplary embodiments of the invention, any suitable visible or non-visible wavelength of light may be used to send a signal to the camera. In other exemplary embodiments according to the systems and methods of the invention sounds that are undetectable to the human ear may be emitted by the communicator to steer the camera. However, the signal used may be any known or later-developed signal which can be transmitted and detected.

In other exemplary embodiments according to the systems and methods of the invention the camera may be replaced with any known or later-developed detection device. For example, the user may not require a video record, but may want to be alerted that someone is speaking. A photodetector may be used to pick up the LED signal and then may alert a user that the LED is activated.

In other exemplary embodiments according to the systems and methods of the invention the LED may be activated by something other than sound. Basically any known or later-developed system that detects something may activate the LED. For example, a user may want to capture an event such as an experiment being conducted in a laboratory. The user may be waiting for a particular event to occur such as for example the production of a certain chemical. A device that detects the chemical may be used to trigger the LED and thus start a video recording of the event.

In various exemplary embodiments of systems and methods according to this invention, a method of manipulating an image capturing device is provided that includes detecting a sensed condition; outputting an optical output signal based on the sensed condition; receiving the optical output signal; and manipulating the image capturing device based on the received optical output signal.

In various exemplary embodiments of systems and methods according to this invention, the detecting step includes detecting an audio signal.

In various exemplary embodiments of systems and methods according to this invention, the detecting step includes detecting an audio signal with a microphone disposed proximate a user.

In various exemplary embodiments of systems and methods according to this invention, the outputting step includes emitting a light signal with a light emitting diode (LED).

In various exemplary embodiments of systems and methods according to this invention, the outputting step includes emitting a light signal with an LED that is disposed proximate to a user.

In various exemplary embodiments of systems and methods according to this invention, the receiving step includes receiving the output light signal emitted by the LED.

In various exemplary embodiments of systems and methods according to this invention, the manipulating step includes manipulating an image capturing device based on the received light signal emitted by the LED.

In various exemplary embodiments of systems and methods according to this invention, the manipulating step includes orienting, zooming, focusing, or other control processes of the image capturing device so as to capture images of a user or users proximate a microphone that has detected an audio signal.

In various exemplary embodiments of systems and methods according to this invention, the manipulating step includes orienting the image capturing device so as to capture images of a user proximate an LED that has omitted a light signal.

In various exemplary embodiments of systems and methods according to this invention, the manipulating step includes controlling the image capturing device so as to capture images of multiple users proximate multiple microphones that have detected audio signals, either currently or at an earlier time.

In various exemplary embodiments of systems and methods according to this invention, a method for automatically operating an image capturing apparatus is provided that includes transmitting a light signal to the image capturing apparatus; and controlling the image capturing apparatus based on the transmitted light signal.

In various exemplary embodiments of systems and methods according to this invention, the transmitting step includes transmitting the light signal in response to an audio signal.

In various exemplary embodiments of systems and methods according to this invention, the transmitting step includes transmitting a light signal that is infrared.

In various exemplary embodiments of systems and methods according to this invention, an apparatus for manipulating an image capturing device is provided that includes a detector that detects a sensed condition; an optical output device that outputs an optical output signal based on the sensed condition; a receiving device that receives the optical output signal; and a controller that manipulates the image capturing device based on the received optical output signal.

In various exemplary embodiments of systems and methods according to this invention, the detector is an audio detector that detects an audio signal.

In various exemplary embodiments of systems and methods according to this invention, the detector is a microphone disposed proximate a user.

In various exemplary embodiments of systems and methods according to this invention, the optical output device emits a light signal using a light emitting diode (LED).

In various exemplary embodiments of systems and methods according to this invention, the receiving device receives the light signal emitted by the LED.

In various exemplary embodiments of systems and methods according to this invention, the receiving device is a video camera.

In various exemplary embodiments of systems and methods according to this invention, the controller manipulates an image capturing device based on the received light signal emitted by the LED.

An automatic image capturing apparatus control system comprising a communicator including a detector and transmitter, and an image capturing apparatus being controlled by signals emitted from the transmitter.

An image capturing apparatus control system wherein the transmitter emits a light signal in response to an audio signal detected by the detector.

However, the invention is not limited to the above described use of LEDs and other structures. For example, the invention is intended to cover any method and apparatus that manipulates a camera based on an optical signal.

DETAILED DESCRIPTION OF PREFERRED EMBODIMENTS

Figure 1:
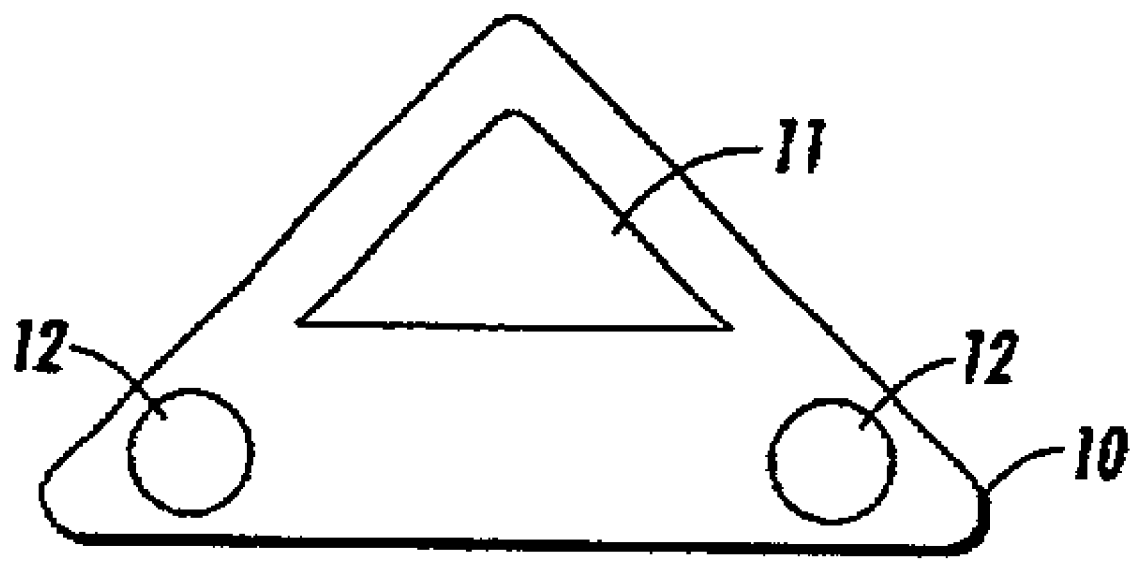
FIG. 1 shows one exemplary embodiment of a communicator according to this invention.
Figure 2:
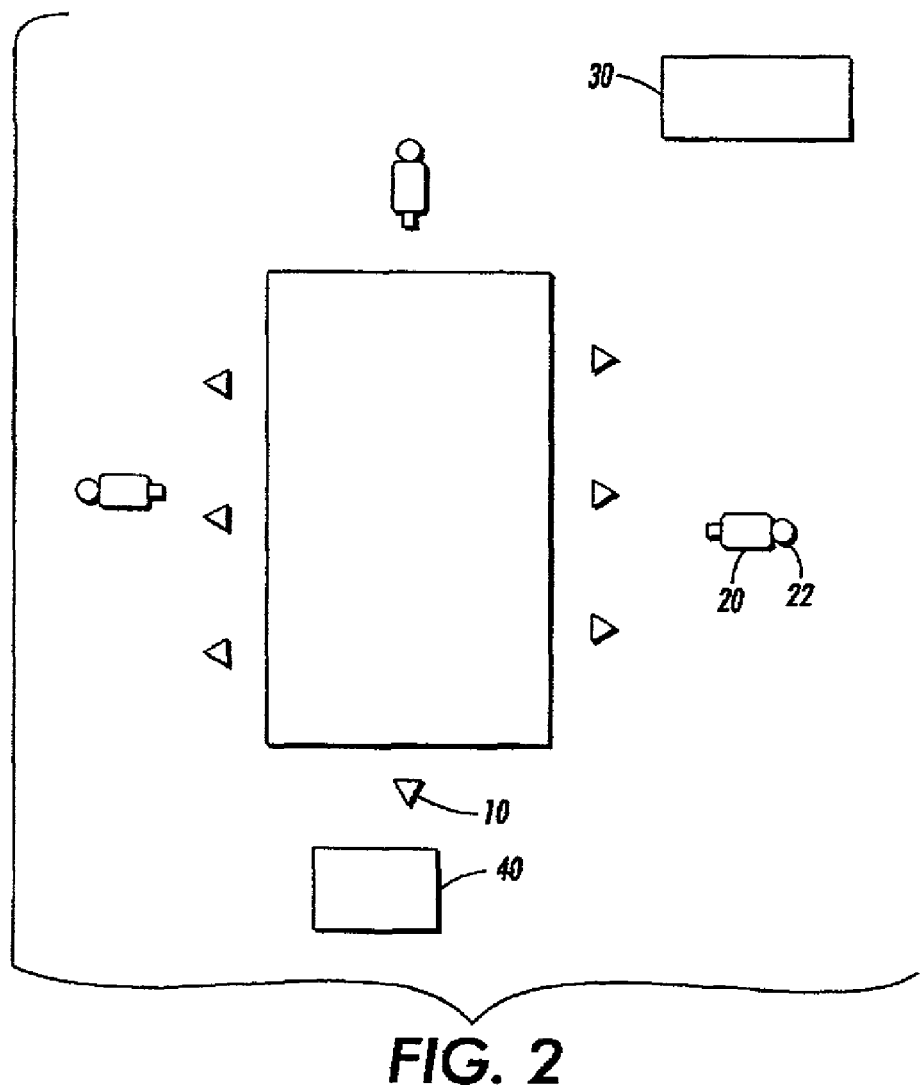
FIG. 2 is a block diagram showing one exemplary embodiment of a system for automatic meeting capture according to this invention.
Figure 3:
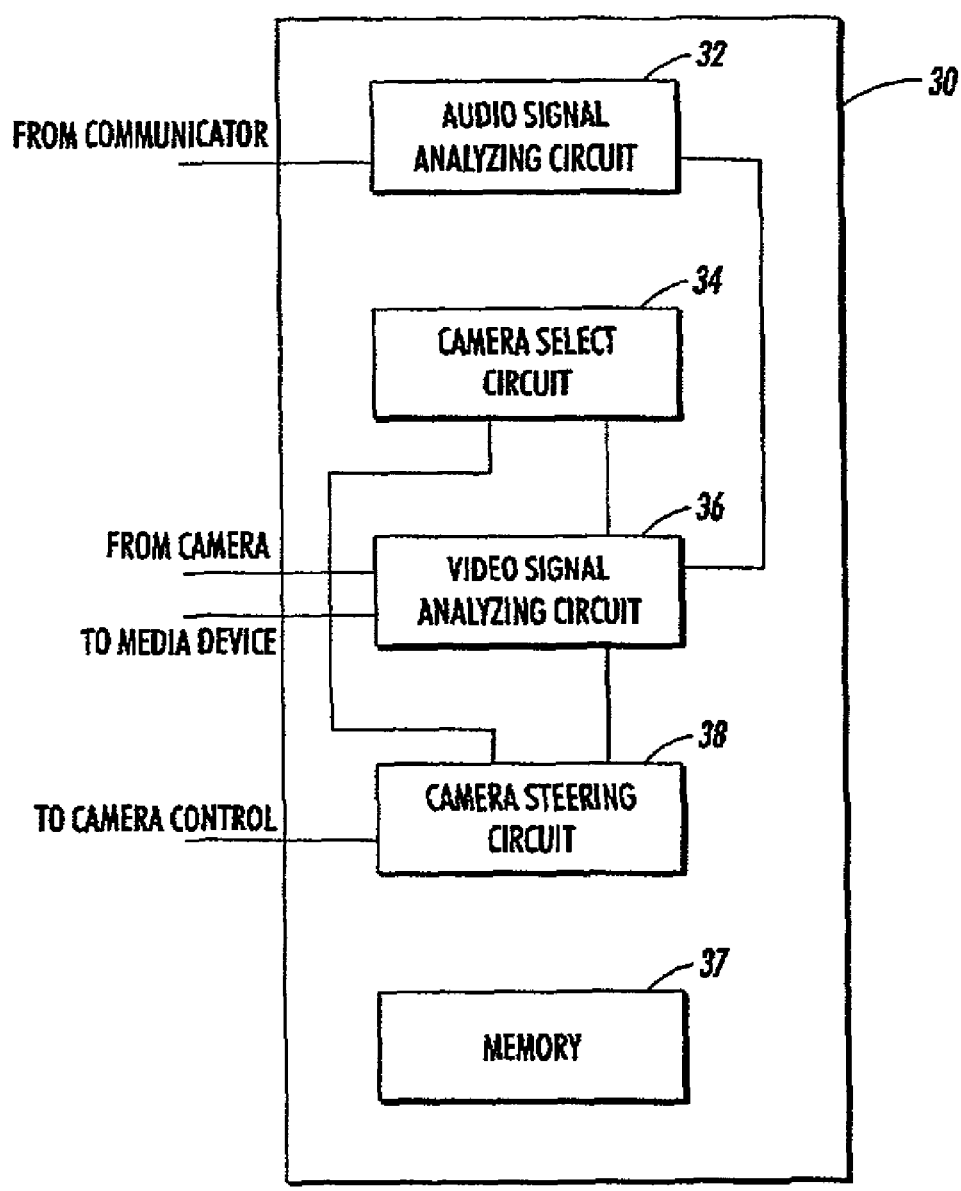
FIG. 3 is a block diagram of a image capturing device system according to one exemplary embodiment of the invention.
Figure 4:
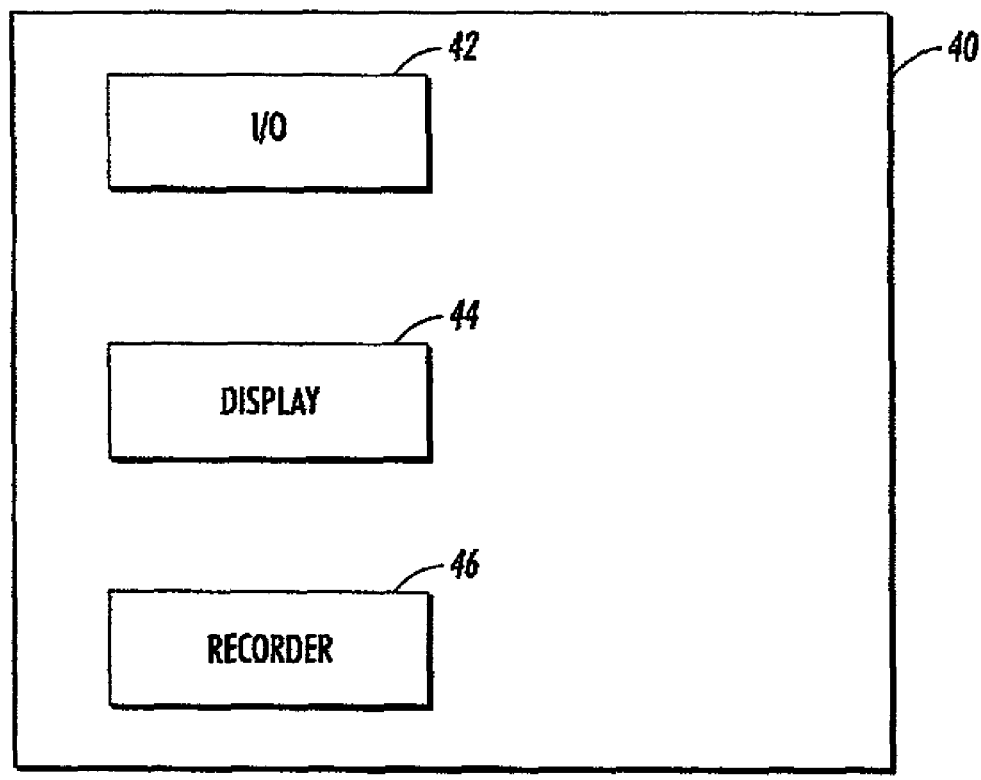
FIG. 4 is a block diagram of a media device according to one exemplary embodiment of the invention.

FIG. 1 illustrates a communicator 10 with a microphone 11 and LED 12. The microphone 11 can be wireless, or can be any suitable device for picking up and transmitting audio signals. The communicator 10 can be worn by participants on their clothes, eyeglasses, etc. In one exemplary embodiment according to the systems and methods of the invention, the one or more LED 12 emits modulated IR LED emissions. (IR emissions are desirable because they are not humanly observable, however the camera is sensitive to IR wavelengths. However, in various exemplary embodiments visible wavelengths can also be used.) The modulated IR LED emissions may contain encoded information, but can primarily be used for automatic camera steering control. Each potential participant in a video conference can have a communicator 10. Audio signals above a certain threshold can be used to activate transmission of IR signals.

In various exemplary embodiments of the systems and methods according to the invention an optional omnidirectional LED signal photosensor, or array of photosensors which can determine the angle of incidence of LED signals, can be used to sense all LED signals. The sensed modulated signals can be compared with those detected via the cameras. Any detected signals which are not present from the cameras can be used to cause one or more cameras to zoom out and orient towards the new LED sources.

In various exemplary embodiments of the invention, communicators 10 can be programmed at the beginning of the session to result in the view triggered by the communicator 10 to be a fixed offset from center of the communicator 10. For example, if the participant is wearing the communicator 10, such as on his or her left shirt pocket, the system can find the head of the participant relative to the communicator 10 by computing an offset/perspective correction based on the IR emission (for example, based on a training procedure in which a user has offset the camera from the associated LED to point at the user's face or a group of proximal faces), or by using a head finding algorithm that finds the head nearest to the communicator, rather than just using the centroid.

In various exemplary embodiments of the systems and methods according to the invention the communicator 10 may have a button to toggle the view, mute the microphone 11, and change the display to, for example, a split screen.

In various exemplary embodiments of the systems and methods according to the invention the communicator 10 may have an input device which allows the user to input the user's name and/or other information, such as a pointer into a database, for the system to associate with the communicator.

In one exemplary embodiment according to the systems and methods of the invention, infrared LEDs 12 can intermittently emit infrared detection signals to establish spatial location. The pattern of infrared blinking seen through comparison of multiple frames of the video cameras 20 can be used to positively identify infrared LEDs 12 and transfer identification information or other data. Use of two or more LEDs 12 could allow, through triangulation, determination of the angle of rotation of an object to assist in steering for cameras 20. Use of multiple LEDs 12 can increase accuracy of position determination and multiple identification LEDs can be used to increase the rate of data transfer. Two or more LEDs 12 can also be used to determine distance from the cameras 20. Therefore focusing and/or zooming can be controlled based simply on geometry.

A variety of infrared signal sources can be used for camera calibration, spatial localization identification and data transfer. In one exemplary embodiment of the invention infrared signal sources can be active infrared tags that internally generate infrared light or passive infrared tags that controllably reflect incident infrared light in response to incident infrared light provided by an infrared light source. A lithium battery, photoelectric cell or other known or later-developed long life power source can apply a low voltage power source for driving the modules. In the default state modules can be held in a power down mode. It should be appreciated that any known or later-developed light source suitable for camera steering may be employed according to the systems and methods of the invention.

In various exemplary embodiments of the invention, information associated with each participant can be input to the communicator by various means such as alphanumeric keying. Data may be downloaded to the camera control unit 30 at the start of the session, or whenever the LED 12 is active and in the field of the camera 20. Alternatively, the information can be embedded in the audio stream. Alternatively, information is loaded into the system at the central unit. In various exemplary embodiments, the LED 12 on the communicator 10 can output a fixed ID which then can be looked up in a central database contained in memory 37 or accessible over a network. In various exemplary embodiments a user could pull up a web page containing information to program the communicator 10 with data. In other exemplary embodiments a user could have a personal communicator 10, preprogrammed with user information.

The participant information may be displayed on the video recording. For example, the name of the participant may be displayed as well as any other pertinent information. Prerecorded exhibits may be matched with the participant based on the participant information, and automatically included in the display or called up by use of a switch on the communicator 10.

In one exemplary embodiment, cameras 20 can be conventional and widely commercially available CCD or CMOS video cameras having overlapping fields of view. The video cameras 20 can be capable of detecting both visible light and infrared, and are further configured to capture a sequence of images at predefined frame rates. Electronics associated with the cameras 20 can separate video and LED information and send signals to the camera control unit 30. It should be appreciated that any known or later-developed cameras capable of detecting a transmitted signal may be employed according to the systems and methods of the invention.

Audio information may be used to determine which audio and video signal is output by the camera control unit 30 to the media cabinet 40 for display, transmission and/or recording. The media cabinet 40 can record the information on any suitable known or later developed recording medium such as VHS or digital recording. If the camera control unit 30 determines that there are simultaneous speakers, then more than one video and audio signal can be output to the media cabinet 40 which may combine the information in any suitable manner. For example, the information can be recorded in a split screen format, or the camera can pan, zoom and focus to include the multiple speakers or even the present and previous speakers.

A communicator 10 that picks up an audio signal above a set threshold includes a circuit that can activate the LEDs 12 to emit an infrared signal. The infrared signal can be detected by one or more video cameras 20. Video cameras 20 can send an image signal and a spatialization signal to camera control unit 30. The camera control unit 30 can receive the signals from one or more cameras 20. In one exemplary embodiment according to the systems and methods of the invention, a single camera 20 may be employed. Once the camera 20 receives the IR signal emitted from a communicator 10, the camera 20 may maintain focus on the participant associated with that communicator 10 until the communicator 10 no longer emits a signal. Alternatively, the system may be programmed to focus on a participant who speaks the loudest, by controlling the LED 12 emission based on the speaker's volume.

In another exemplary embodiment according to the systems and methods of the invention, one of the participants such as a moderator may be given the ability to prioritize participants. Prior to the start of the conference each participant's communicator 10 could be encoded with a priority code relative to each participant. The code would give a participant priority over some or all other participants. The priority of a participant may change over the course of a conference. For example, in a debate the participant who is exercising his/her opportunity to respond would be given priority. Many of the above described exemplary embodiments would work as well with the use of multiple camera 10 systems.

By comparing the infrared signal in accordance with the audio signal the camera control unit 20 is able to match the appropriate signals. If one communicator 10 is in use, the camera 20 control unit 30 can make a determination as to which camera 20 is able to obtain the best resolution for capturing the speaker. The camera control unit 30 can adjust the cameras 20 to obtain the best angle for each and then determine which camera 20 can produce the best picture based on predetermined parameters such as best angle of vision. The camera control unit 30 can then forward the image signal to media device 40.

The media device 40 includes an input/output 42, display 44 and/or a recorder 46. The input/output may include the standard inputs commonly found on any recording device. This includes play, pause, fast forward, rewind and stop. The input/output may also allow the user to perform editing functions. For example, if more than one participant speaks at a time, the user may want to have the video recording switch to a split screen. After reviewing the recording the user may decide that it is preferable to maintain a single screen. The user may be able to edit the recording to revert to a single screen display.

The recorder may be an analog, digital or any other known or later developed recording means. The recorder may include the capability to provide multiple recordings so that each participant can receive a copy.

The camera control unit 30 includes an audio signal analyzing circuit 32, a camera select circuit 34, a video signal analyzing circuit 36 a memory 37, a camera control circuit 38, and an optional omnidirectional LED sensing circuit, (not shown). The audio signal analyzing circuit 32 receives an audio signal transmitted by microphone 11. The communicator 10 has previously been associated with a participant as described above. The signal may be transmitted by any known or later developed suitable means including R/F transmission or wires. The signal can be analyzed to prevent the recording of incidental noises. If the video signal analyzing circuit 36 determines that the signal warrants recording, for example, based on the previously described priority, the audio signal and video signal will be transmitted to the media device 40.

Camera control unit 30 can detect the modulated LED signals interpret the LED information to control the camera The camera select circuit 34 can determine which camera 20 or cameras will be used to collect the video signal. The camera select circuit can send a signal to the camera control circuit 34 which can adjust the cameras 20 selected by the camera select circuit 34. The camera control circuit 34 can send a signal to camera controller 22. Camera controller 22 may include any suitable known or later-developed system for performing an inclination, declination, panning, zoom and focusing function for the camera, as well as any other now or later developed camera control functions.

Optional omnidirectional sensing circuit is used to detect active LEDs which are not in the current field of view of any camera. A modulated signal which does not correlate with one of the LED signals being detected by a camera is used by the camera control unit 30 to zoom out and pan one or more cameras to accept the new LED signal location. If the LED position had been previously entered, the camera control unit 30 need only pan an appropriate camera to the associated speaker.

The functions of the camera control unit 30 may be implemented on a programmed general purpose computer. However, the camera control unit 30 functions can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like.

The memory 37 can be implemented using an appropriate combination of alterable, volatile or non-volatile memory of non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

When the LEDs 12 of the communicator 10 are activated by the participant speaking, the operation of the LEDs 12 can be picked up by one or more of the cameras 20. The LEDs transmit a signal that is associated with communicator 10 from which it emanates. The cameras 20 transmit a video signal to the video signal analyzing circuit 36. The video signal may be transmitted by any suitable known or later-developed means including cable or wireless transmission. The signal or signals can be analyzed by the camera select circuit 34. Cameras 20 in a predetermined referenced position to visually record the participant associated with an activated communicator 10 may begin to have their output collected. The camera select circuit 34 may choose a default camera, a camera determined to initially be in the best position to record or may store in memory 37 all camera signals until a final camera is chosen. The final camera may be chosen based on its final position after each of the cameras are adjusted by the camera steering circuit 38 to optimize the view of participant or participants associated with an activated communicator 10. The audio signal and the video signal will be appropriately matched by the video signal analyzing circuit 36 and directed to the media device 40 where it will be combined into the same video stream.

In a similar manner a camera control unit 30 can select speakers and cameras at separate locations, such as different cities. In a similar manner, a recorder may be associated with each camera, with the "selection" of data from an individual camera happening based on the recorded IR signals long after the recording has been completed. This enables creation of multiple viewpoints of a large event.

In various exemplary embodiments the time delay that may occur between the point in time a speaker begins to speak and the point in time the speaker's image begins to be captured may be minimized or set so that brief utterances are filtered.

The LEDs 12 associated with inactive communicators 10 may intermittently emit an infrared signal. The signal will be detected by the video cameras 20 not currently being used to record a speaker. The video cameras 20 can then be positioned so that when a participant begins speaking, the camera will need minimal adjustment when it begins to record the speaker.

In one exemplary embodiment according to the systems and methods of the invention one or more conference participants are given a pointer capable of emitting a modulated beam or beams in a wavelength range which the camera can sense. A speaker may want to incorporate an exhibit into his presentation. By aiming the pointer at a display screen, for example, a camera 20 can focus on the view screen and the view screen may temporarily replace the speaker on a display of the conference. In other exemplary embodiments the conference display may present a pre-defined viewing format such as split-screen that shows both the speaker and the view screen.

In other exemplary embodiments according to the systems and methods of the invention, the speaker may use the pointer to draw an outline around an exhibit, such as a sheet of paper. The speaker may then place the exhibit so as to be in view of a camera 20 other than the camera 20 which is capturing the image of the speaker. Further, the participant can choose to have the drawn path used as an overlay on the current video images. In various exemplary embodiments a camera 20 may be dedicated to capturing exhibits. In various other exemplary embodiments the participant may hold up the exhibit so that the camera 20 capturing the image of the speaker also captures the exhibit. The system will perform an offset/correction based on the LED signal of the communicator 10 and the signal of the pointer. Similarly, the selection of communicators may be determined based on the presentation material being displayed by the speaker. For instance, when bullet 3 of slide #34 is displayed, pan to communicator #32 to gauge the listener's reaction.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of manipulating an image capturing device that captures images of a scene to be displayed, comprising:
   detecting a sensed condition;
   outputting at least one optical output signal by one or more devices of a plurality of devices, based on the sensed condition;
   receiving at least one optical output signal from at least one device of the plurality of devices with an image sensor of the image capturing device which captures the images of the scene to be displayed;
   receiving at least one optical output signal from at least one device of the plurality of devices with an omnidirectional sensing circuit, wherein the omnidirectional sensing circuit determines an angle of incidence of the at least one optical output signal received by the image sensor of the omnidirectional sensing circuit;
   comparing the at least one optical output signal received by the omnidirectional sensing circuit with the at least one optical output signal received by the image capturing device; and
   manipulating the image capturing device based on the compared optical output signals.

2. The method of claim 1, wherein the detecting includes detecting an audio signal.

3. The method of claim 2, wherein the at least one device comprises a microphone disposed proximate to a user and the detecting includes detecting an audio signal with the microphone.

4. The method of claim 1, wherein the outputting includes outputting one or more optical signals with light emitting diodes (LEDs).

5. The method of claim 4, wherein the outputting includes outputting optical signals with LEDs that are disposed proximate to a user.

6. The method of claim 5, wherein the receiving at least one optical output signal from at least one device of the plurality of devices with the image capturing device includes receiving the output optical signals emitted by the LEDs and wherein the receiving at least one optical output signal from at least one device of the plurality of devices with the omnidirectional sensing circuit includes receiving the output optical signals emitted by the LEDs.

7. The method of claim 6, wherein the manipulating includes manipulating the image capturing device based on the compared optical output signals, the at least one optical output signal received by the omnidirectional sensing circuit with the at least one optical output signal received by the image capturing device emitted by the LEDs.

8. The method of claim 7, wherein the manipulating includes orienting the image capturing device so as to capture images of a user proximate to a microphone that has detected an audio signal.

9. The method of claim 8, wherein the manipulating includes orienting the image capturing device so as to capture images of a user proximate to at least one LED that outputs an optical output signal.

10. The method of claim 8, wherein the manipulating includes zooming and focusing the image capturing device so as to frame the image of one or more users proximate to the at least one outputting optical signals from at least one LED.

11. The method of claim 1, wherein the at least one optical signal is encoded with digital information.

12. The method of claim 1, wherein the outputting further comprises outputting one or more optical signals from an optical output device comprising a toggle feature that, when actuated, selects volume settings and also display settings for images captured by the image capturing device.

13. A method for automatically operating an image capturing apparatus that captures images of a scene to be displayed, comprising:
    transmitting at least one light signal to an image sensor of the image capturing apparatus that captures the images of the scene to be displayed and at least one light signal to an omnidirectional sensing circuit, wherein the omnidirectional sensing circuit determines an angle of incidence of the at least one light signal transmitted thereto,
    comparing the transmitted at least one light signal to the omnidirectional sensing circuit with the transmitted at least one light signal to the image sensor of the image capturing device; and
    controlling the image capturing apparatus based on the compared transmitted light signals.

14. The method of claim 13, wherein the transmitting includes transmitting the light signal in response to an audio signal.

15. The method of claim 13, wherein the transmitting includes transmitting a light signal that is infrared.

16. The method of claim 13, wherein the at least one light signal is encoded with digital information.

17. The method of claim 13, wherein the outputting further comprises outputting one or more optical signals from an optical output device comprising a toggle feature that, when actuated, selects volume settings and also display settings for images captured by the image capturing device.

18. An apparatus for manipulating an image capturing device that captures images of a scene to be displayed, comprising:
    a detector that detects a sensed condition;
    at least one optical output device that outputs an optical output signal based on the sensed condition;
    a receiving image sensor that captures the images of the scene to be displayed in the image capturing device and an omnidirectional sensing circuit that each receive the optical output signals, wherein the omnidirectional sensing circuit determines an angle of incidence of the at least one optical output signal received by the omnidirectional sensing circuit,
    a comparing device that compares the at least one optical output signal received by the omnidirectional sensing circuit with the at least one optical output signal received by the image sensor of the image capturing device; and
    a controller that manipulates the image capturing device based on the compared optical output signals.

19. An apparatus for manipulating an image capturing device according to claim 18 wherein the detector is an audio detector that detects an audio signal.

20. An apparatus for manipulating an image capturing device according to claim 18 wherein the detector is a microphone disposed proximate to a user.

21. An apparatus for manipulating an image capturing device according to claim 20 wherein the optical output device emits the optical output signal using a light emitting diode (LED).

22. An apparatus for manipulating an image capturing device according to claim 21 wherein the receiving device receives the optical output signal emitted by the LED.

23. An apparatus for manipulating an image capturing device according to claim 21 wherein the image capturing device is a video camera.

24. An apparatus for manipulating the image capturing device according to claim 22 wherein the controller manipulates the image capturing device based on the received optical signals emitted by the LED.

25. The apparatus of claim 18, wherein the at least one optical signal is encoded with digital information.

26. An automatic image capturing apparatus control system comprising:
   a communicator including a receiver and a transmitter;
   an image capturing apparatus that captures images of a scene to be displayed containing at least one of a receiver that receives signals emitted by the communicator and captures the displayed scene and a transmitter, the image capturing apparatus being controlled by signals emitted from the transmitter of the communicator; and
   an omnidirectional sensing circuit, the omnidirectional sensing circuit including a receiving means for receiving the signals emitted from the transmitter of the communicator, and optionally signals emitted from the transmitter of; the image capturing apparatus;
   wherein the omnidirectional sensing circuit determines an angle of incidence of the signals emitted by the transmitter of the communicator and received by the receiving means of the omnidirectional sensing circuit,
   a comparator that compares the signal received by the receiving means of the omnidirectional sensing circuit with the signal received by the receiver of the image capturing apparatus,
   wherein the image capturing apparatus is controlled based on the comparison.

27. An automatic image capturing control system according to claim 26 wherein the transmitter emits an optical signal in response to an audio signal received by the receiver of the communicator.

28. An automatic image capturing apparatus system according to claim 27 wherein the optical signal is an infrared signal.

29. The system of claim 26, wherein the at least one signal is encoded with digital information.

30. An automatic image capturing control system according to claim 26 wherein the transmitter of the communicator emits a digitally modulated optical signal in response to both an audio signal received by the receiver of the communicator and a programmed input.

31. A method of manipulating an image capturing device that captures images of a scene to be displayed, comprising:
   detecting means to detect a sensed condition;
   outputting means to output at least one optical output signal based on the sensed condition;
   receiving means in an image capturing device and in an omnidirectional sensing circuit to receive the at least one optical output signal, wherein the omnidirectional sensing circuit determines an angle of incidence of the at least one optical output signal received by the omnidirectional sensing circuit and wherein the receiving means in the image capturing device also captures the images of the scene to be displayed,
   comparing means to compare the at least one optical output signal received by the omnidirectional sensing circuit with the at least one optical output signal received by the receiving means of the image capturing device; and
   manipulating means to manipulate the image capturing device based on the compared optical output signals.

32. The method of claim 31, wherein the at least one optical signal is encoded with digital information.

33. The method of claim 31, wherein the outputting further comprises outputting one or more optical signals from an optical output device comprising a toggle feature that, when actuated, selects volume settings and also display settings for images captured by the image capturing device.

* * * * *